(12) United States Patent
Brodigan

(10) Patent No.: US 6,289,381 B1
(45) Date of Patent: Sep. 11, 2001

(54) VIDEO AND DATA COMMUNICATION SYSTEM HAVING DOWNSTREAM NETWORK INTERFACE ENTITLEMENT PROFILE FOR RESTRICTING TRANSMISSION TO SELECTION DEVICE

(75) Inventor: Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/196,919

(22) Filed: Nov. 20, 1998

(51) Int. Cl.[7] .................. G06F 15/173; G06F 15/177
(52) U.S. Cl. .................. 709/225; 709/238; 713/201; 348/7; 714/712
(58) Field of Search .................. 709/238, 245, 709/250, 249, 244, 231, 230, 232, 223, 224, 225; 348/7; 713/200, 201, 202; 714/712

(56) References Cited

U.S. PATENT DOCUMENTS

| | | |
|---|---|---|
| 4,962,449 | 10/1990 | Schlesinger . |
| 5,239,648 | 8/1993 | Nukui . |
| 5,263,165 | 11/1993 | Janis . |
| 5,410,344 * | 4/1995 | Graves et al. ............... 348/1 |
| 5,473,361 * | 12/1995 | Penney ........................ 348/6 |
| 5,589,872 * | 12/1996 | Martinez ..................... 348/12 |
| 5,652,795 | 7/1997 | Dillon et al. . |
| 5,686,966 * | 11/1997 | De La Cierva, Sr. ....... 348/461 |
| 5,870,474 * | 2/1999 | Wasilewski et al. ......... 380/21 |
| 5,940,843 * | 8/1999 | Zucknovich et al. ........ 707/516 |
| 6,018,765 * | 1/2000 | Durana et al. ............... 709/217 |
| 6,189,037 * | 2/2001 | Adams et al. ............... 709/230 |

* cited by examiner

*Primary Examiner*—Dung C. Dinh
(74) *Attorney, Agent, or Firm*—Brooks & Kushman P.C.

(57) ABSTRACT

A broadband communication system comprises a broadband host digital terminal and a network interface. The host digital terminal connects to a network that is connected to at least one information source that sends information over the network to the host digital terminal. The network interface is configured such that a selection device may be connected to the network interface for requesting a desired information item for reception. The host digital terminal has a profile corresponding to the network interface. The profile indicates a limited set of entitled information items that the network interface is entitled to receive. The host digital terminal sends the desired information to the network interface when the desired information is within the set of entitled information items.

12 Claims, 1 Drawing Sheet

VIDEO AND DATA COMMUNICATION SYSTEM HAVING DOWNSTREAM NETWORK INTERFACE ENTITLEMENT PROFILE FOR RESTRICTING TRANSMISSION TO SELECTION DEVICE

TECHNICAL FIELD

The present invention relates to communication systems for providing video and/or data services.

BACKGROUND ART

An existing service provider, which may be a video information provider, a data service provider, or a video and data provider, has a central office from which information is communicated to a network interface. For example, a coaxial cable may run from the office through a neighborhood, and have numerous physical drops that run into customer houses. The network interface, at the end of a physical drop, connects to a set top box that is used by the end user to select desired items for reception as video or data items.

In these existing systems, the provider's entire bandwidth of information is sent from the office, and is present at each physical drop. As such, the set top box or selection device has access to all of the bandwidth, and if desired may be programmed to allow or forbid access to certain portions of the entire bandwidth of information.

Although these existing systems have been employed in many video and/or data communication systems that have been commercially successful, there are inherent disadvantages in these types of systems. For example, because these systems send the entire bandwidth of information to each network interface, the provider may have to limit the amount of video and/or data available due to physical limitations of the physical drops. Further, because the entire bandwidth of information from the provider is available at the network interface, it may become difficult for the provider to prevent an end user from accessing information items such as, for example, pay-view channels, without paying. Still further, in addition to the disadvantages mentioned above, another disadvantage associated with these existing systems is that when an end user is unable to receive information over the network, it may be very difficult to isolate the source of the problem. That is, the problem may be at the central office, or anywhere along the communication path from the office to the network interface.

For the foregoing reasons, there is a need for an improved video and data communication system that overcomes the problems and limitations of the prior art.

DISCLOSURE OF INVENTION

It is, therefore, an object of the present invention to provide a broadband communications system that utilizes profiles corresponding to the network interfaces such that a request for information at the network interface is checked against the corresponding profile to verify entitlement to the requested information.

In carrying out the above object, other objects, and features of the present invention, a broadband communication system is provided. The communication system comprises a broadband host digital terminal and a network interface. The host digital terminal connects to a network that is connected to at least one information source that sends information over the network to the host digital terminal. The network interface communicates with the host digital terminal to receive information therefrom. The network interface is configured such that a selection device may be connected to the network interface for selecting a desired information item for reception. The host digital terminal has a profile corresponding to the network interface. The profile indicates a limited set of entitled information items that the network interface is entitled to receive. The host digital terminal sends the desired information item to the network interface, upon request, when the desired information item is within the set of entitled information items.

Preferably, the host digital terminal forbids the desired information item when the desired information item is without the set of entitled information items. Still further, a preferred embodiment of the system further comprises a network unit between the host digital terminal and the network interface. The network interface is connected to the network unit. At least one additional network interface is connected to the network unit. As such, the host digital terminal has at least one additional profile corresponding to the at least one additional network interface.

In a preferred embodiment, the system further comprises a test information source for connecting to the network to deliver test information to the host digital terminal. The test information is in the set of entitled information indicated by the profile that corresponds to the network interface. A testing selection device is capable of requesting the desired information item for reception as the test information. The test information may be video test information or data test information.

Further, in carrying out the present invention, a testing selection device for use in a broadband communications system is provided. The testing selection device is configured to connect to the network interface and is capable of requesting a desired information item from a test information source for reception at the network interface. The host digital terminal has a profile corresponding to the network interface. The profile is indicative of a limited set of entitled information items that the network interface is entitled to receive. The limited set includes information from the test information source and may further include information from an information source such as a video and/or data provider. The host digital terminal sends the desired information item to the network interface with the desired information item is within the set of entitled information items. As such, the testing selection device allows an end user to access information from the test information source to help isolate any existing problems that may be occurring.

Still further, in carrying out the present invention, a method for managing a communication system including a broadband host digital terminal in communication with at least one information source is provided. A network interface in communication with the host digital terminal receives information therefrom. A selection device may be connected to the network interface for requesting a desired item for reception. The method comprises establishing a profile at the host digital terminal, and upon receiving a request for a desired information item, sending the desired information item to the network interface when the desired information item is within a limited set of entitled information items. The profile corresponds to the network interface and is indicative of the limited set of entitled information items that the network interface is entitled to receive. Preferably, the limited set includes information from the at least one information source and information from a test information source. A standard selection device may be connected to the network interface for requesting a desired information item from the at least one information source for reception. Preferably, the method further comprises providing a testing selection device configured to connect to the network interface and capable of requesting a desired information item from the test information source for reception at the network interface.

The advantages associated with the embodiments of the present invention are numerous. For example, embodiments of the present invention utilize profiles corresponding to the network interfaces so that information need only be sent to the network interface upon request thereof. Further, the requested information may be checked against the profile corresponding to the particular network interface prior to sending the requested information to the network interface. Because embodiments of the present invention eliminate the need to have the entire bandwidth of a provider available at the network interface, an end user may have increased options for selecting different providers and services. Further, preferred embodiments of the present invention utilize video and data test information sources configured as their own service providers separate from the video information providers and data service providers such that problems with receiving information at the network interface may be analyzed to determine whether the problem is at the provider, or with the communication path, as will be further explained herein.

It is to be appreciated that preferred embodiments of the present invention provide standard video and/or data sources to test from a customer network interface through the broadband network. Further, preferably, access to test information sources is limited to technicians by requiring a particular type of set top box or test selection device. Further, broadband video and data can be tested from the customer interface without video or data entitlements being provisioned to a physical drop. Thus, a customer may test the video and data broadband network signaling capability prior to subscribing to a service from any particular provider.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
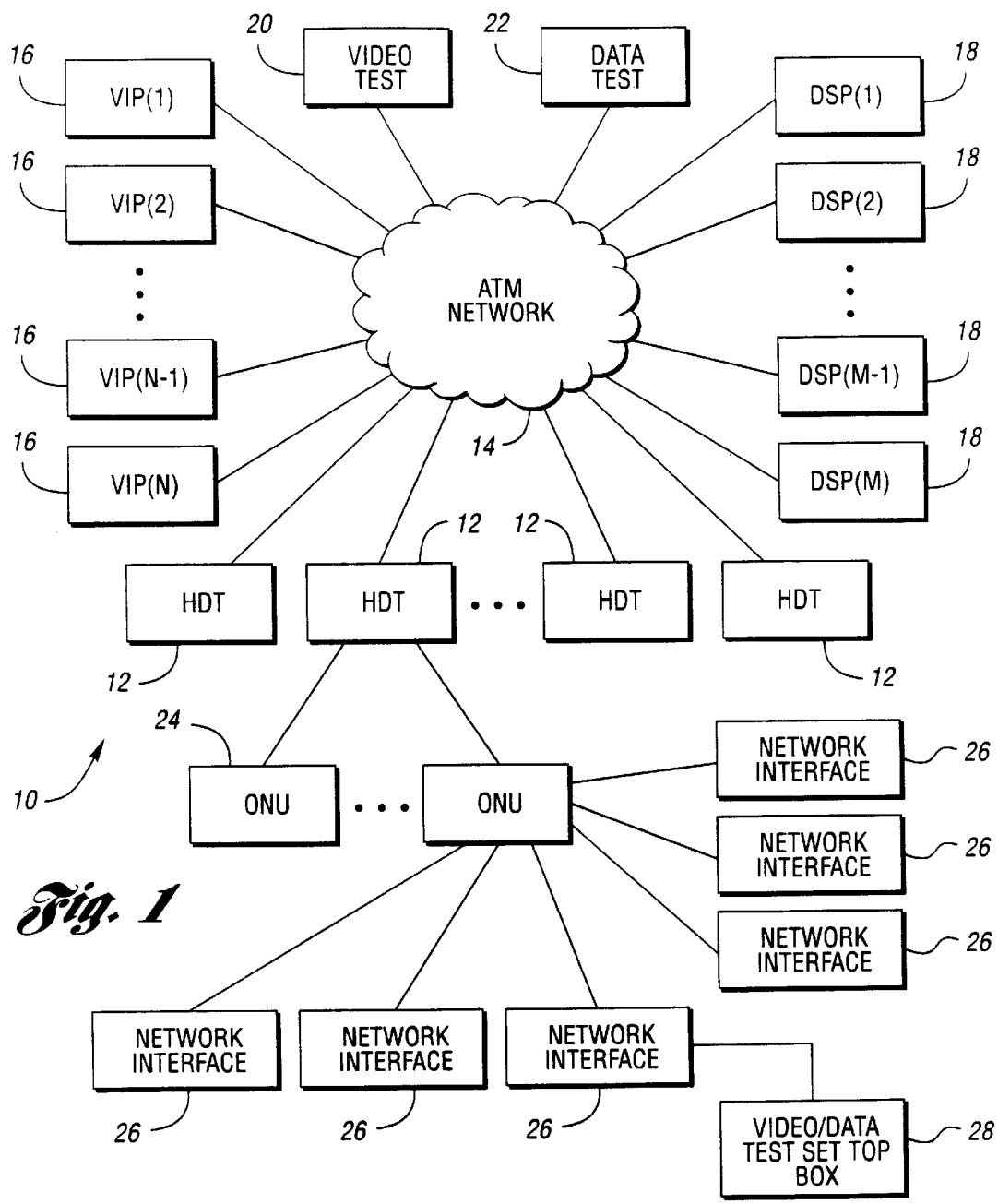
FIG. 1 is a diagram illustrating a system of the present invention for providing video and/or data services to a network interface while utilizing profiles.

With reference to FIG. 1, a system of the present invention for communicating video and/or data information, which may include video test information and/or data test information, is generally indicated at 10. System 10 includes a plurality of host digital terminals 12. Of course, as few as one host digital terminal, or any number of host digital terminals may be provided. Host digital terminal 12 acts as a central office and contains the profiles as will be later explained. Host digital terminal 12 is connected to an asynchronous transfer mode (ATM) network 14. Of course, other networks may be suitable and it is to be appreciated that ATM network 14 is merely one example of a suitable network for connection to host digital terminal 12.

Any number of providers may connect to ATM network 14 to provide information to host digital terminal 12. That is, only one provider need be connected to ATM network 14, but it is an inherent advantage of embodiments of the present invention that a plurality of providers may all be connected to ATM network 14 for providing information to host digital terminal 12. As illustrated, a plurality of video information providers 16 are connected to ATM network 14. Further, a plurality of digital service providers 18 are connected to ATM network 14. Of course, it is to be appreciated that if desired, a single provider may provide both video and data services. Further, in a preferred embodiment of the present invention, a video test information provider 20 and a data test information provider 22 are connected to ATM network 14. Of course, these test providers are not required, but are very advantageous in that network problems may be more readily analyzed as will be described. Further, it is to be appreciated that although video test information provider 20 and data test information provider 22 are shown as separate providers, as is preferred, a single testing provider that is capable of communicating both video and data information may be provided in the alternative.

Each host digital terminal 12 is connected to one or more network units 24. Network unit 24 is preferably an optical network unit. As such, fiber is preferably used to connect host digital terminal 12 to network unit 24. Network unit 24 may be any one of a variety of types including, for example, a broadband network unit (BNU) or a universal service access multiplexer (USAM). Network unit 24 connects to at least one network interface 26. Of course, any number of network interfaces 26 may be connected to network unit 24 and the appropriate number of network interfaces may be determined based on physical distances and available bandwidths at various portions of system 10 as will be further described. As the connection between host digital terminal 12 and network unit 24 is preferably fiber, the connection between network unit 24 and network interface 26 is preferably either copper twisted pair or coaxial cable. Of course, the use of fiber, copper twisted pair, and coaxial cable is exemplary, and other mediums may be suitable as is appreciated by one of ordinary skill in the art.

Network interface 26 may be, for example, located at the side of a customer home. Within the home, a set top box is connected to network interface 26. In accordance with the present invention, the set top box is a box that requests information from one of the providers, or may be a test set top box for requesting information from video and/or data testing information sources 20 and 22, respectively.

In a preferred embodiment, high bandwidth connections are employed from the providers to host digital terminal 12. A suitable line for connecting providers 16, 18, 20, 22, to ATM network 14 is OC-12c. Of course, OC-12c is merely one example of a high bandwidth medium capable of transmitting a provider's entire bandwidth to host digital terminal 12. As such, a suitable line for connecting ATM network 14 to host digital terminal 12 is also OC-12c. In accordance with the present invention, each network interface 26 has a corresponding profile at host digital terminal 12. Accordingly, all of the information available to any network interface 26 at any network unit 24 is present at host digital terminal 12. However, prior to sending any information from host digital terminal 12 to any network unit 24 for subsequent transmission to network interface 26, the requested information items are checked against the profile that corresponds to the requesting network interface 26. However, even though less bandwidth may be required from host digital terminal 12 to network unit 24 than between host digital terminal 12 and ATM network 14, OC-12c is a suitable line for connecting host digital terminal 12 to various network units 24. Of course, other line types may be suitable such as, for example, OC-3, which has a lower bandwidth than OC-12c. Further, it is to be appreciated that fiber is preferably used to connect host digital terminal 12 to network units 24 to allow long distances between host digital terminal 12 and network unit 24. As such, this fiber to neighborhood layout allows, for example, copper twisted pair or coaxial cable to run from network unit 24 to network interfaces 26 within the neighborhood.

As mentioned previously, each network interface 26 has a corresponding profile at host digital terminal 12. The profile indicates a limited set of entitled information items that network interface 26 is entitled to receive. The profile may contain, for example, a list of providers that the corresponding network interface 26 subscribes to. Further, the profile may contain more detailed information, such as for any particular provider the profile may contain specifics as to the particular channels that the end user at the network interface subscribes to. Thus, it is to be appreciated that in accordance with the present invention, network interface 26 must request information from host digital terminal 12 in order to receive it. As such, an end user at network interface 26 may not unscramble signals that are not within the end user's profile, because these signals are not available at network interface 26. When network interface 26 requests a desired information item for reception, host digital terminal 12 checks with the corresponding profile, and sends the desired information item to network interface 26 when the desired information item is within the limited set of entitled information items listed in the profile.

It is to be appreciated that the use of profiles at host digital terminal 12 greatly enhances a video and/or data communication system. Further, it is to be appreciated that, although not required, video test information source 20 and data test information source 22 may be provided to further enhance the performance of system 10. Preferably, a number of test providers are connected to ATM network 14. These test providers preferably are in the profile for each network interface 26. As such, if an end user at network interface 26 is having problems receiving information from a video information provider 16 or data service provider 18, the physical connections to network interface 26 may be tested by requesting information from video test source 20 or data test source 22. Preferably, although the testing information sources are in every profile, the standard set top box preferably is not capable of requesting this testing information. As such, preferably, a testing selection device or test set top box is required to request information from any of the testing information sources. That is, the preferred embodiments of the present invention employ individual profiles corresponding to individual network interfaces, in addition to multiple selection devices or set top boxes. As such, a particular network interface may be capable of receiving a limited set of information as defined by the corresponding profile, with different portions of this limited set of information being receivable by using different set top boxes.

Figure 2:
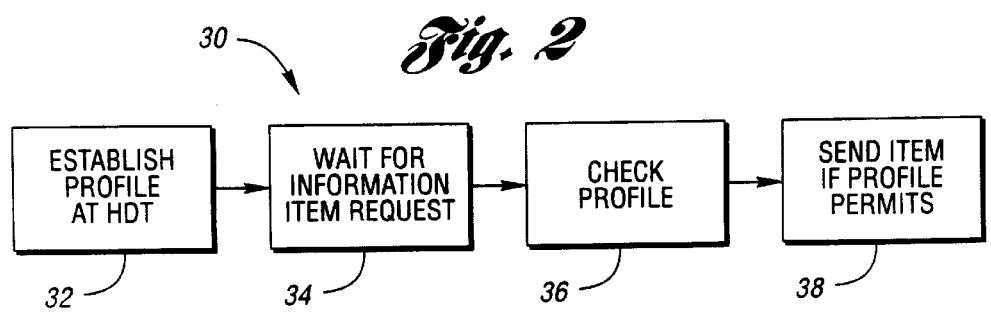
FIG. 2 is a block diagram illustrating a method of the present invention for utilizing profiles that correspond to the network interfaces.

With reference to FIG. 2, a method of the present invention is generally indicated at 30. At block 32, a profile is established at a host digital terminal. At block 34, a host digital terminal waits for an information item request from one of the network interfaces. At block 36, the host digital terminal checks the desired information item against the corresponding profile for the requesting network interface. At block 38, the host digital terminal sends the desired information item if the profile permits sending thereof. Of course, as mentioned above, although information may exist within a particular profile, the type of set top box such as standard or testing may limit the ability of the network interface to request particular information. Further, it is to be appreciated that the use of network units 24 is optional, and that applications of the present invention may directly connect network interfaces 26 to a host digital terminal 12 when appropriate.

Although generally described above, in the preferred embodiment test lines and selection devices are provided. Access to the video/data test lines is controlled by the broadband network provider establishing the test lines as though the provider is a video/data service provider. Being its own service provider would prevent a customer from accessing these lines from their video or data device because test line channels are not provisioned with their VIP/DSP entitlements (profile). Preferably, to avoid test line access problems, the broadband network automatically provisions all video/data physical drops to access the video test lines and restricts access by using a network test device that has a unique device equipment type and sub type value that is sent when the device signs onto the network. The unique device equipment type and sub type guarantees that only technicians with a special test device can access the test lines. The video/data test device preferably provides for data as well as multiple Motion Picture Experts Group (MPEG 2) decoder capability equal to the maximum network supported simultaneous video streams to a single physical video device, example:support of 3 or 4 concurrent video streams to a single set top box. As such, a standard device may sign on to the network to access most providers, while a special device such as a test device may be required to access the remaining providers which may be test providers.

VIDEO

Preferably, video test lines are implemented as follows. Each video stream has its own permanent virtual circuit or PVC (virtual path identifier/virtual channel identifier or VPI/VCI) through the ATM network to the host digital terminal or HDT. Broadband Network Provider establishes the video test lines as its own video information provider. Each video stream has a standard service handle assigned as well as a user perceived channel assignment where required. Technicians can use the standard channel change command to change from the video 201 test line and the video 202 test line. Additional test lines can be established as required, for example IPPV.

1. DLB Complex Video 201 Test Line

This should be a fixed high action video, MPEG 2 video clips encoded at 6 Mbps. Video clips should include sporting events like basketball as well as a wheat field with the wind slowly blowing. The purpose of the various video clips is to detect delay as well as loss in the video source. MPEG 2-P and B frames information loss can be seen on a TV with distortion of the MPEG 2 Macro blocs. MPEG 2-I frame loss can be detected with multiple macro bloc distortion. Delay of MPEG 2 video streams can be seen with motion being frozen in time. The video clip should be 5 minutes in length with a no transmission of video for 10 seconds. Before sending a video clip a MPEG 2 private data packet will be sent first indicating the start of the video clip. A second MPEG 2 video clip will be sent 5 seconds after the completion of the video clip indicating the end of the video clip. The video clip will continue to be broadcast from the video server as identified above. By using the private data packets to frame the video clip a video test set can measure a known MPEG video stream for loss of data or addition of data, example noise, insuring the MPEG 2 video clip arrives at the customer's drop completely intact. User perceived channel could be "201".

2. DLB Simple Video 202 Test Line

This test line will support still pictures and talking head MPEG 2 video clips encoded at 4 Mbps. The still can be a standard video test pattern and the talking head can be a standard news broadcast without high action video clips. Broadcast procedures and framing is the same as one (1) above. User perceived channel could be "202".

3. DLB Data Carousal Test Line

This video channel is used to deliver a standard electronic program guide EPG to a set top box that can be viewed by the technician. The EPG should be broadcasted continually and there is a standard service handle assigned but there is not a user perceived channel assigned because this channel is automatically connected to the test set data carousal PVC upon signing onto the network. Content to the EPG should change every 60 seconds so that the technician can verify proper operation and connection of the data carousal source. No user perceived channel.

DATA

Preferably, data test lines are implemented as follows. Establish an IP based data source on the network server for video/data test lines connected to an ATM network that connects to each broadband host digital terminal (HDT). There should be up to 4-PVC established to each HDT to enable testing by different technicians on different broadband drops at the same time. There should be several different files stored that can be accessed by the technician using the video/data test set. For example, a 200 kilobyte file, a 1 megabyte file, a 10 megabyte file, and a 60 megabyte file may be provided. The technician will request a file transfer using FTP and measure time to receive the file, look for errors in the file using cycle redundacy check (CRC) and make sure the file was received completely by looking at the file size received. The speed of this data line should be established at 1 Mbps. No user perceived channel required.

Of course, it is to be appreciated that the above description of the preferred embodiment for test line and selection device implementation is not meant to be limiting. As such, there are a variety of different configurations for test lines and associated standard and test selection devices, such as described generally prior to the preferred test line and selection device implementation description. Further, it is to be appreciated that preferred embodiments of the present invention would include test lines and have many advantages. For example, standard video and data test sources may be used to test the quality of the broadband network to deliver broadcast video and high speed data to a customer drop which may be, for example, a coaxial cable or twisted copper pair to the home or business. Further, by utilizing device types and/or device subtypes, a network interface's (that is, a customer's) profile may be used in combination with the device type and/or subtype for the selection device to determine when to send the requested information to the network interface. Thus, by placing the test providers in all profiles as preferred, a technician with a test selection device may test video/data services before the physical drop is provisioned to support a customer's video information provider or data service provider.

Further, the test lines may be utilized to isolate the source of trouble to either a problem at the network interface, or a problem at the provider. Of course, in addition to these advantages, there are many other advantages that are apparent to one of ordinary skill in the art of video and data communication systems after reviewing the above description of the present invention along with the description of the preferred test line and selection device implementation for use in preferred embodiments of the present invention.

While the best mode for carrying out the invention has been described in detail, those familiar with the art to which this invention relates will recognize various alternative designs and embodiments for practicing the invention as defined by the following claims.

What is claimed is:

1. A broadband communications system comprising:

a broadband host digital terminal within a broadband network that is connected to at least one information source that sends information downstream over the broadband network to the host digital terminal; and a network interface in broadband communication with and downstream of the host digital terminal within the broadband network for receiving information from the host digital terminal, the network interface being configured such that a selection device may be connected to the network interface for requesting a desired information item for reception from the host digital terminal over the broadband network, the host digital terminal having a profile corresponding to the network interface, wherein the profile is indicative of a limited set of entitled information items that the network interface is entitled to receive from the host digital terminal over the broadband network, and wherein the host digital terminal sends the desired information item downstream to the network interface when the desired information item is within the set of entitled information items.

2. The system of claim 1 wherein the host digital terminal forbids the desired information item when the desired information item is without the set of entitled information items.

3. The system of claim 1 further comprising:

a network unit within the broadband network between the host digital terminal and the network interface, wherein the network interface is connected to the network unit; and at least one additional network interface connected to the network unit, wherein the host digital terminal has at least one additional profile corresponding to the at least one additional network interface.

4. The system of claim 1 further comprising:

a video test information source for connecting to the network to deliver video test information to the host digital terminal, wherein the video test information is in the set of entitled information indicated by the profile that corresponds to the network interface, and wherein a testing selection device is capable of requesting the desired information item for reception as the video test information.

5. The system of claim 4 wherein the video test information comprises a video clip encoded at least about 4 Mbps.

6. The system of claim 5 wherein the video clip is encoded at least about 6 Mbps.

7. The system of claim 5 wherein the video clip an MPEG 2 video clip.

8. The system of claim 4 wherein the video test information comprises a standard electronic program guide.

9. The system of claim 1 further comprising:

a data test information source for connecting to the network to deliver data test information to the host digital terminal, wherein the data test information is in the set of entitled information indicated by the profile that corresponds to the network interface, and wherein a testing selection device is capable of requesting the desired information item for reception as the data test information.

10. For use in a broadband communications system including a broadband host digital terminal within a broadband network and in communication with and downstream of an information source, and a network interface in broadband communication with and downstream of the host digital terminal within the broadband network for receiving information therefrom, wherein a standard selection device may be connected to the network interface for requesting a desired item from the information source for reception from the host digital terminal over the broadband network, a selection device comprising:

a testing selection device configured to connect to the network interface and capable of requesting a desired information item from a test information source for reception at the network interface, the host digital terminal having a profile corresponding to the network interface, wherein the profile is indicative of a limited set of entitled information items that the network interface is entitled to receive from the host digital terminal over the broadband network, the limited set including information from test information source, and wherein the host digital terminal sends the desired information item downstream to the network interface when the desired information item is within the set of entitled information items.

11. A method for managing a communications system including a broadband host digital terminal in communication with and downstream of at least one information source, and a network interface in communication with and downstream of the host digital terminal for receiving information therefrom, wherein a selection device may be connected to the network interface for requesting a desired item for reception, the method comprising:

establishing a profile at the host digital terminal, the profile corresponding to the network interface and being indicative of a limited set of entitled information items that the network interface is entitled to receive; and upon receiving a request for a desired information item, sending the desired information item downstream to the network interface when the desired information item is within the set of entitled information items.

12. The method of claim 11 wherein the limited set includes information from a test information source, the method further comprising:

providing a testing selection device configured to connect to the network interface and capable of requesting a desired information item from the test information source for reception at the network interface.

* * * * *